United States Patent [19]
Manabe

[11] 3,728,602
[45] Apr. 17, 1973

[54] SYSTEM OF DRIVING A PULSE MOTOR

[75] Inventor: Mitsuo Manabe, Tokyo, Japan

[73] Assignee: Fujitsu Limited, Kawasaki-shi, Kanagawa-ken, Japan

[22] Filed: Mar. 8, 1971

[21] Appl. No.: 121,662

[30] Foreign Application Priority Data

Mar. 23, 1970 Japan..............................45/24201

[52] U.S. Cl.................................................318/434
[51] Int. Cl..................................................H02p 7/00
[58] Field of Search....................318/685, 443, 444, 318/138, 696, 434, 332

[56] References Cited

UNITED STATES PATENTS

| | | | |
|---|---|---|---|
| 3,526,819 | 9/1970 | Graf | 318/434 |
| 3,414,795 | 12/1968 | Weiser | 318/434 |
| 3,412,307 | 11/1968 | Welsh | 318/434 |
| 3,452,263 | 6/1969 | Newell | 318/138 |
| 3,424,961 | 1/1969 | Leenhouts | 318/696 |

Primary Examiner—Harold Broome
Attorney—Robert E. Burns and Emmanuel J. Lobato

[57] ABSTRACT

A high DC voltage is supplied to the exciting coil of a pulse motor and the current flowing in the exciting coil is detected and it is instantly cutoff when the above-mentioned current reaches a predetermined value. Accordingly, the pulse motor can be advantageously provided with a small power loss in a switching circuit as well as in the exciting circuit, because the value of a series resistor of the exciting coil can be decreased to a minimum or even to zero. Further, a quick response frequency characteristic and a simple and economical circuit capable of automatically adjusting the exciting current at all time can be expected, because the high voltage is impressed upon the exciting coil.

6 Claims, 14 Drawing Figures

Fig. 1A PRIOR ART

Fig. 1B PRIOR ART (I) INPUT SIGNAL (II) OPERATION OF TRANSISTOR Q1

(III) VOLTAGE ACROSS EXCITING COIL 3

(IV) VOLTAGE ACROSS RV1

(V) CURRENT IN EXCITING COIL 3

(I) INPUT SIGNAL

(II) WAVEFORM ON BASE OF Q3

(III) WAVEFORM ON BASE OF Q2

(IV) OPERATION OF Q3

(V) OPERATION OF Q2

(VI) VOLTAGE BETWEEN TERMINAL 6 AND G.

(VII) CURRENT IN EXCITING COIL 7

SYSTEM OF DRIVING A PULSE MOTOR

The present invention relates to a system of driving a pulse motor used in an input-output unit of an electric computer and a digital control device and so forth.

The number of phases of most pulse motors used in the above-stated unit or device is generally either three or five in consideration of torque and frequency response characteristics. It is well-known that the output torque can be increased by increasing both the exciting current and the number of turns of the exciting winding and also that the frequency characteristic can be improved by increasing the numbers of exciting phases or carrying out 2 – 3 phases alternate excitation of a 5-phase pulse motor. However, when the number of turns for the exciting coil are increased for the purpose of increasing the torque, the frequency response characteristic becomes unavoidably poor.

It is also well-known, that in order to improve the frequency characteristic, the following three-methods are employed for impressing a high voltage upon the exciting coil:

a. the first method relates to a method of instantaneously impressing a high voltage upon the exciting coil via a parallel circuit of a capacitor and a resistor connected in series with the exciting coil, b. the second method relates to a method of impressing a high voltage at the rise time of the exciting current upon the exciting coil by providing two-circuits for applying low voltage and high voltage, and c. the third method relates to a method of impressing an alternating voltage upon the exciting coil and increasing the above-mentioned alternating voltage at the moment of the rise time of the exciting current.

However, in each of the above-stated three-methods, the following various drawbacks are accompanied, respectively therewith:

a. in the first method, the ohmic loss due to the series resistor, increases and therefore, the first method using a parallel circuit of the capacitor and the resistor is not suitable for a pulse motor having a great torque, b. in the second method of applying the low voltage and high voltage upon the exciting coil, the circuit becomes complex and this leads to a high cost as well as losses in the circuit due to a series resistor, diode, transistor, etc., and c. in the third method for applying the alternating voltage upon the exciting coil, the circuit becomes complex as well as expensive.

Further, each pulse motor is generally provided with a variable series resistor in the exciting circuit for the purpose of adjusting and balancing the exciting current of each phase. However, in the case of a pulse motor for a great torque, a large capacity of the variable resistor is required and accordingly, a great deal of power loss will inevitably be accompanied therewith.

In the system of the present invention, a pulse-frequency control is used; that is; a high DC voltage is supplied to the exciting coil of the pulse motor and the current flowing in the exciting coil is detected and it is cutoff when the above-mentioned current reaches a predetermined value.

Accordingly, the pulse motor of the present invention can be advantageously provided with a small power loss in a switching circuit as well as in the exciting circuit, because the value of the series resistor of the exciting coil can be decreased to a minimum or even to zero.

Further, a quick response frequency characteristic and a simple and economical circuit capable of automatically adjusting the exciting current at all times can be expected, because the high voltage is impressed upon the exciting coil.

Further, features and advantage of the present invention will be apparent from the ensuing description with reference to the accompanying drawings to which, however, the scope of the invention is in no way limited.

Figure 1A:
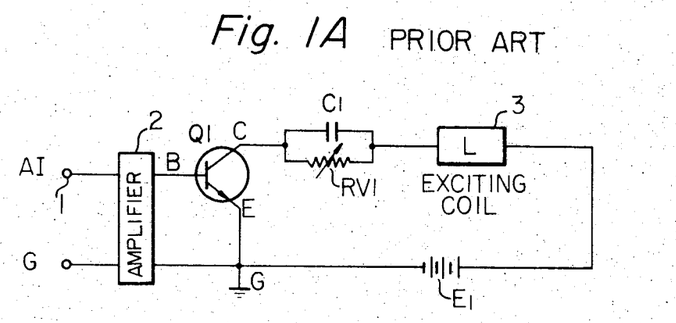
FIGS. 1A and 1B show an example of a driving circuit of a conventional pulse motor showing one phase thereof and a time chart displaying waveforms of several portions in the above-mentioned driving circuit.
Figure 1B:
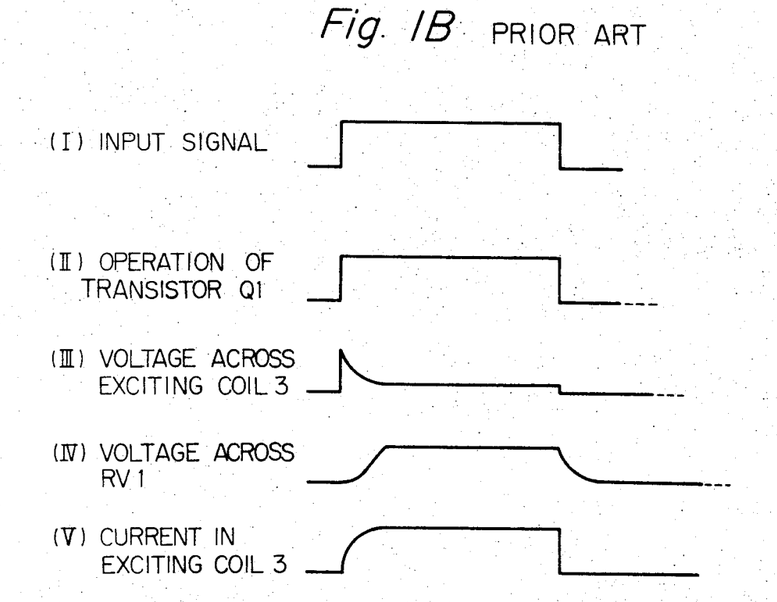

FIG. 1A shows an example of a driving circuit of a conventional pulse motor showing one phase thereof. Referring to FIG. 1A, an exciting signal for a pulse motor is supplied through an input terminal 1 and amplified by an amplifier 2 and then applied to a base B of a switching transistor $Q_1$. When the transistor $Q_1$ operates, an instantaneous voltage $E_1$ is applied to the exciting coil 3 of the pulse motor via a parallel circuit of a capacitor $C_1$ and a variable resistor $RV_1$. And then the capacitor $C_1$ is charged by the voltage $E_1$ and the voltage across the coil 3 decreases and becomes zero. FIG. 1B is a time chart showing a function of FIG. 1A.

Figure 2A:
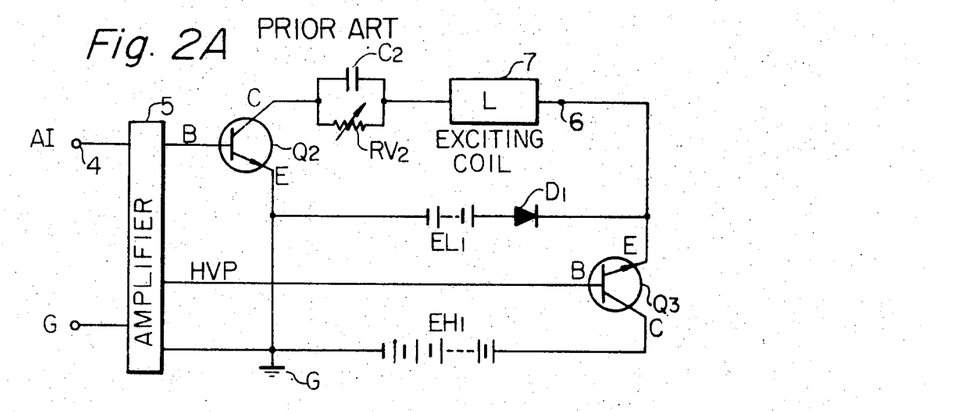
FIGS. 2A and 2B show an embodiment of a driving circuit of another conventional pulse motor and a time chart thereof.
Figure 2B:
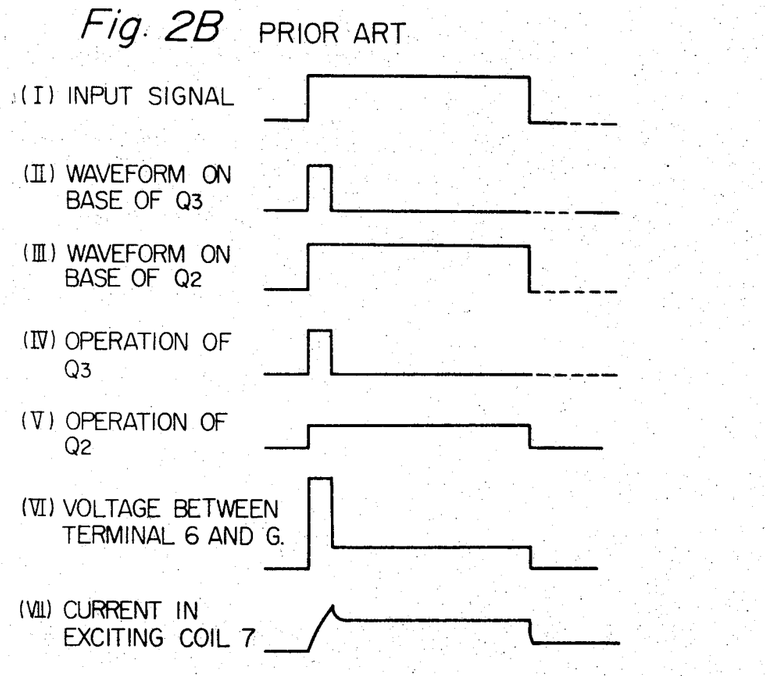

FIG. 2A shows a conventional circuit diagram according to the method of applying the low voltage and the high voltage upon the exciting coil of the pulse motor. Referring to FIG. 2A, an exciting signal for a pulse motor is supplied through an input terminal 4 and this supplied signal is amplified by an amplifier 5 and at the rise time of the exciting signal, a high voltage applying pulse HVP is generated in amplifier 5. When a switching transistor $Q_2$ operates, a low voltage source $EL_1$ is applied to an exciting coil 7 of a pulse motor through a diode $D_1$. Then, a capacitor $C_2$ is charged and the voltage across the exciting coil 7 decreases. At the moment of exciting current rising, HVP signal is applied to a base B of a high voltage switching transistor Q₃ and then a high voltage source EH₁ is applied to the exciting coil 7 and thus, the rise time of the exciting current can be improved. FIG. 2B is a time chart showing a function of FIG. 2A.

Figure 3:
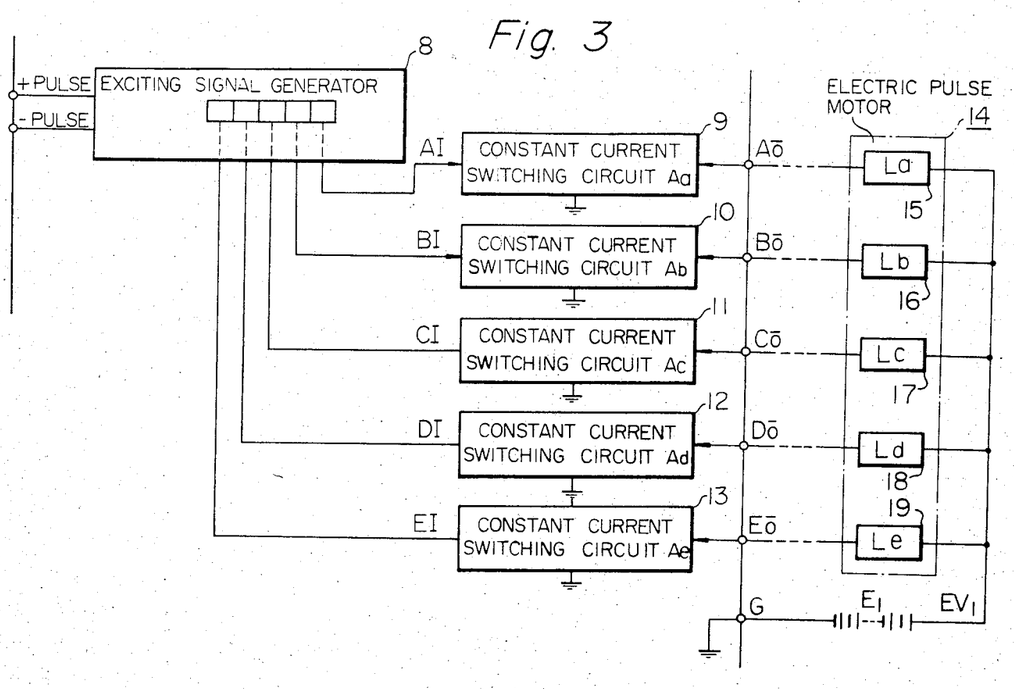
FIG. 3 is a block diagram of an embodiment of the present invention.
Figures 4, 5:
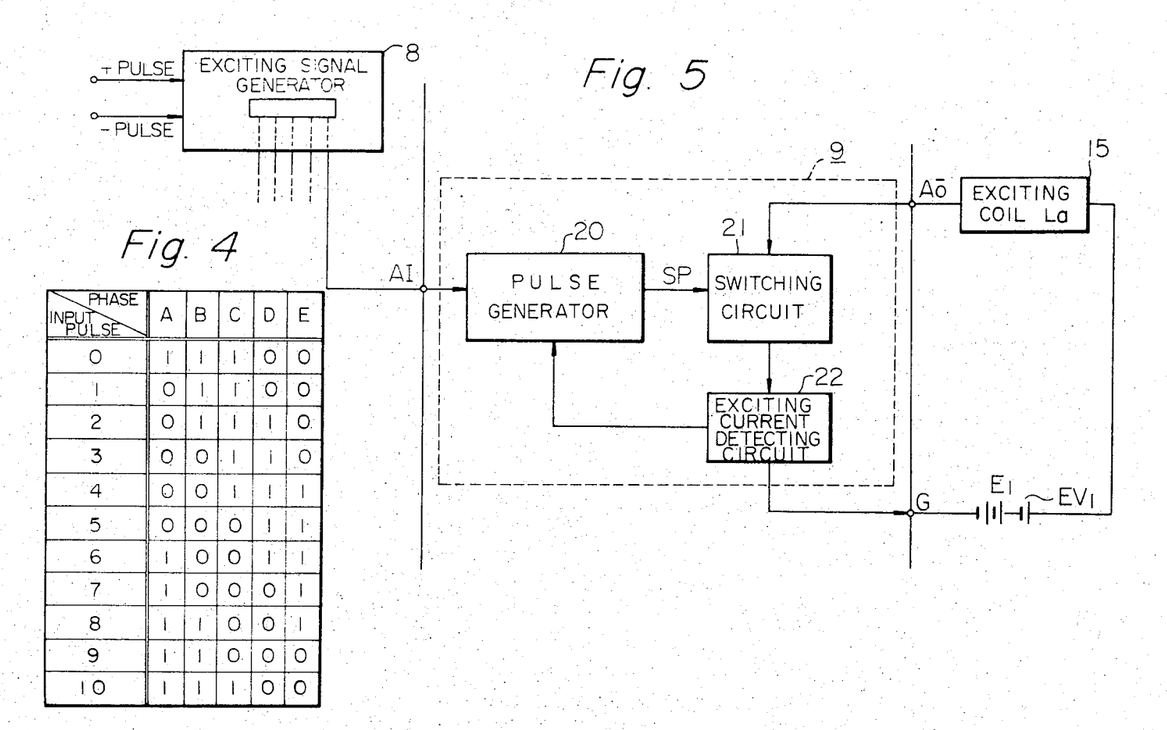
FIG. 4 is a table illustrating actual exciting values.
FIG. 5 is a block diagram of a current switching circuit of FIG. 3.

FIG. 3 shows a block diagram of an embodiment of the present invention. Referring to FIG. 3, five phases of exciting signals AI to EI for the exciting coils of a pulse motor 14 are produced in an exciting signal generator 8. FIG. 4 shows a table showing actual exication values of the pulse motor. In the table shown in FIG. 4, a vertical column shows a number of input pulses applied, and a horizontal column shows five phases, that is, phase A, B, C, D and E. Further, in each phase, a non-exciting state is represented by a binary figure 0 and an exciting state, by a biary figure 1. When an input pulse is applied either on a positive input terminal (+PULSE) or on a negative input terminal (−PULSE) the pulse motor is rotated either in a clockwise or couterclockwise direction, respectively. The 2 − 3 phases alternate exciting signals are supplied to a constant current switching circuit 9 ~ 13. One terminal of the exciting coil 15 to 19 of the pulse motor 14 is connected to a high DC voltage source $E_1$ (24 to 100 V) and another terminal of the exciting coil is connected to the constant current switching circuit 9 ~ 13, respectively.

FIG. 5 shows a block diagram of the constant current switching circuit Aa to Ae (9 ~ 13) in FIG. 3. When an ouput AI of an exciting signal generator 8 becomes logic 1 (zero potential), an output SP of a pulse generator 20 becomes a positive potential and a switching circuit 21 operates and then an exciting current suddenly begins to flow, because a high DC voltage source $EV_1$ is connected to the one side of an exciting coil 15. When this current reaches a predetermined value, an exciting current detecting circuit 22 operates and the output SP of the pulse generator 20 instantly becomes zero potential and the switching circuit 21 assumes a cutoff condition. There is needed a certain period of time till the current again begins to flow.

Figure 6:
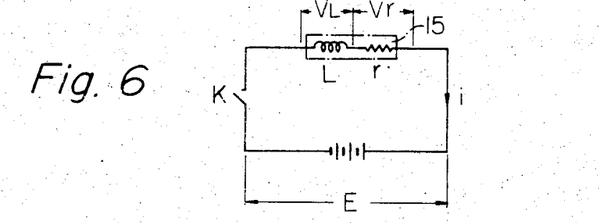
FIG. 6 is an equivalent circuit of an exciting coil of a pulse motor.

As shown in FIG. 6, an equivalent circuit of an exciting coil 15 of a pulse motor can be considered as a series circuit being simply composed of a self-inductance L and a resistor r. An exciting current i at any time t produced by a constant supply voltage E can be obtained by solving the following linear differential Equation 1:

$$E = L(di/dt) + ri \quad (1)$$

$$\int \frac{di}{i - \frac{E}{r}} = -\frac{r}{L} \int dt$$

$$ln(i - (E/r)) = -(r/L)t$$

$$i - (E/r) = ce^{-(r/L)t}$$

when $t = 0$, then $i = 0$ $$-(E/r) = c \text{ (constant)}$$

Hence $$i = (E/r)(1 - e^{-(r/L)t}) \quad (2)$$

Figure 7:
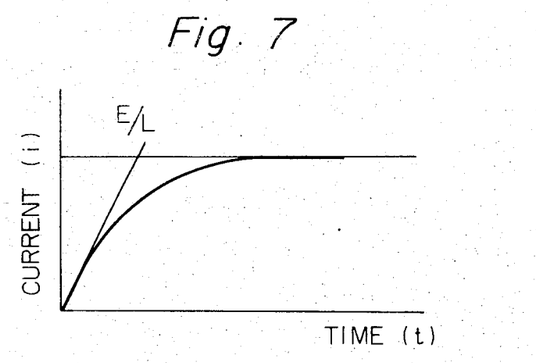
FIG. 7 is a diagram illustrating an exciting current in the circuit of FIG. 6.

As is obvious from Equation 2, the rise rate or time of the transient exciting current i of the pulse motor can be quickened by decreasing the self-inductance L and increasing the supply voltage E. FIG. 7 shows a diagram explaining Equation 2.

Figure 8:
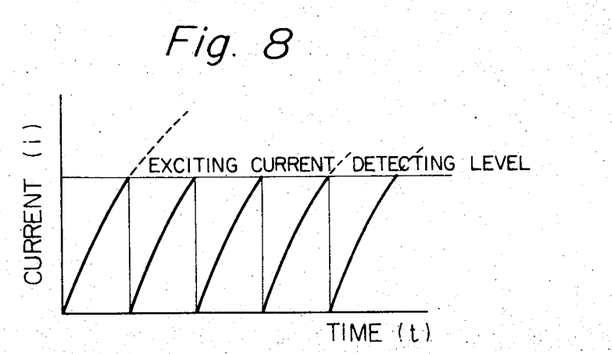
FIG. 8 is a diagram illustrating a waveform for controlling the exciting current in the block diagram of FIG. 5.

FIG. 8 is a diagram showing a waveform for controlling the exciting current in the block diagram of FIG. 5.

Figure 9:
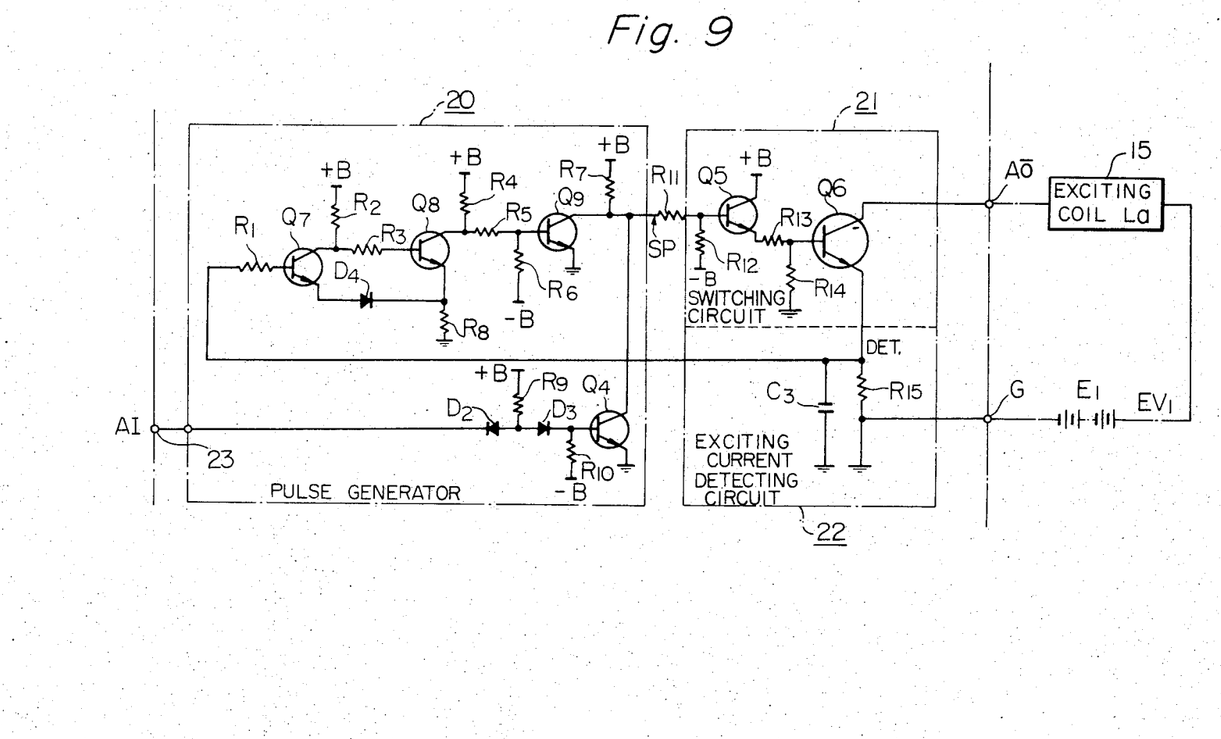
FIG. 9 is a detailed circuit diagram for the block diagram in FIG. 5.

FIG. 9 shows an embodiment of the detailed circuit diagram of FIG. 5. Referring to FIG. 9, an input terminal 23 is connected via diodes D₂ and D₃ to a base of a transistor Q₄ whose emitter is grounded. A junction point between diodes D₂ and D₃ is connected via resistor R₉ to a positive source potential +B, and a junction between the diode D₃ and the base of the transistor Q₄ is connected via resistor R₁₀ to a negative source potential −B. A collector of the transistor Q₄ is connected to a junction between a collector of the transistor Q₉ and a resistor R₁₁. Another terminal of the resistor R₁₁ is connected to a base of a transistor Q₅ whose collector is connected to the positive source potential +B. A junction between the resistor R₁₁ and the base of the transistor Q₅ is connected via a resistor R₁₂ to the negative source potential −B. An emitter of the transistor Q₅ is connected via resistors R₁₃ and R₁₄ to a ground, and the junction between resistors R₁₃ and R₁₄ is connected to a base of a transistor Q₆ whose collector is connected to one terminal of an exciting coil 15. An electric source voltage $EV_1$ is supplied to another terminal of the exciting coil 15. An emitter of the transistor Q₆ is connected to a parallel circuit of a resistor R₁₅ and a capacitor C₃, and another terminal of the parallel circuit is connected to a ground. A junction between the above-mentioned parallel circuit and the emitter of the transistor Q₆ is connected via resistor R₁ to a base of a transistor Q₇. An emitter of the transistor Q₇ is connected via a diode D₄ and a resistor R₈ to a ground. A collector of the transistor Q₇ is connected via a resistor R₂ to the positive potential source +B, and also is connected via a resistor R₃ to a base of a transistor Q₈ whose emitter is connected to a junction between the diode D₄ and the resistor R₈. A collector of the transistor Q₈ is connected via a resistor R₄ to the positive potential source +B, and also is connected, via resistor R₅, to a base of a transistor Q₉ whose emitter is grounded. A junction between resistor R₅ and the base of the transistor Q₉ is connected via a resistor R₆ to the negative source potential −B. The collector of the transistor is connected to the collector of the transistor Q₄ and is also connected via a resistor R₇ to the positive source potential +B.

When an output SP of the pulse generator 20 becomes a positive potential in the above-mentioned circuit, a switching transistor Q₆ assumes an on state via a transistor Q₅ and then an exciting current begins to flow through an exciting coil 15. This exciting current is detected as a potential at a point DET of an exciting current detecting circuit composed of a parallel circuit of a capacitor C₃ and a resistor R₁₅. When the exciting current reaches a predetermined value, a transistor Q₇ assumes an on condition by the potential on the point DET. As a result of this, a transistor Q₈ becomes an off condition and the ouput SP becomes zero potential via a transistor Q₉ and the transistors Q₅ and Q₆ assume an off condition and thus, the exciting current is blocked. When the exciting current is blocked, the charge stored in the capacitor C₃ is discharged through the resistor R₁₅ and the potential on the point DET falls or decreases and thus, the transistor Q₇ again assumes an off condition, thereby the transistor Q₆ again becomes an on condition.

An input signal AI for exciting or non-exciting the exciting coil 15 is supplied to an input terminal 23. The excitation corresponds to a zero potential and non-excitation corresponds to a positive potential. Namely, when the positive potential is supplied to the terminal 23, a transistor $Q_4$ becomes an on condition and renders the output SP of the switching circuit 20 to zero potential so as to prevent the transistor $Q_5$ from being energized. On the other hand, when the zero potential is supplied to the terminal 23, the output SP becomes a positive potential and the above-mentioned operation can be performed.

Figure 10:
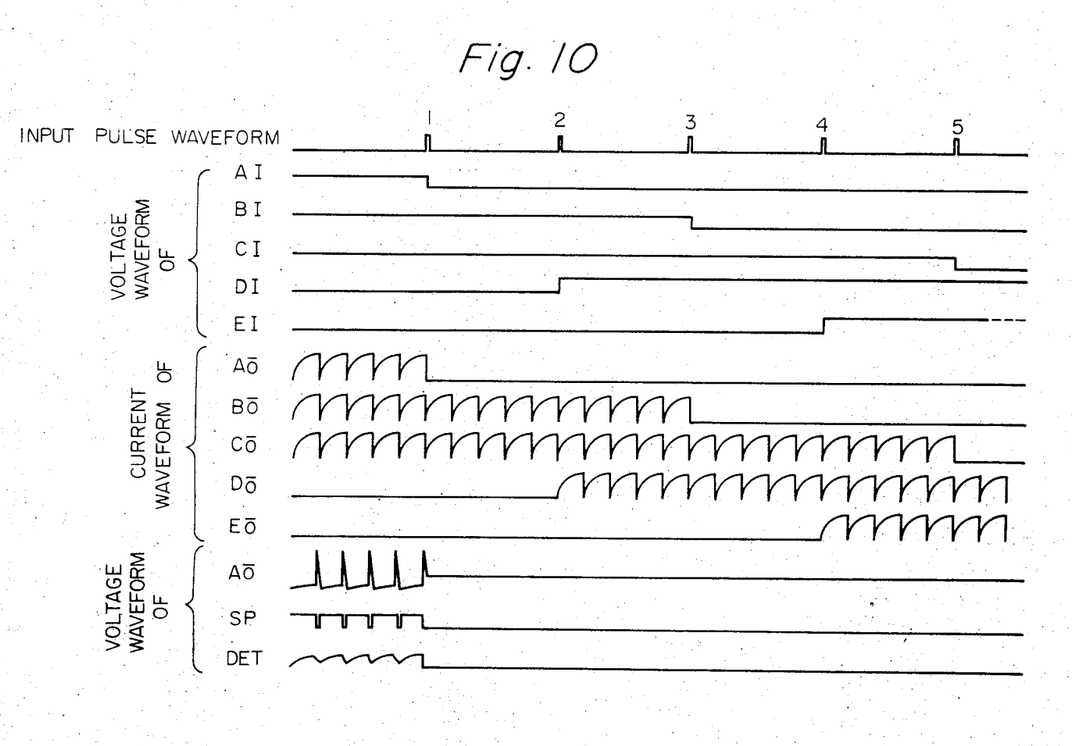
FIG. 10 is a waveform diagram for several parts of FIGS. 3 and 9.

FIG. 10 is a diagram showing waveforms for several parts of FIGS. 3 and 9. Referring to FIG. 10, an input pulse waveform, voltage waveforms of the exciting signals (AI~EI), current waveforms of the switching circuit ($\overline{AO}$~$\overline{EO}$) and waveforms for several parts of FIG. 9 are shown.

Figures 11, 12:
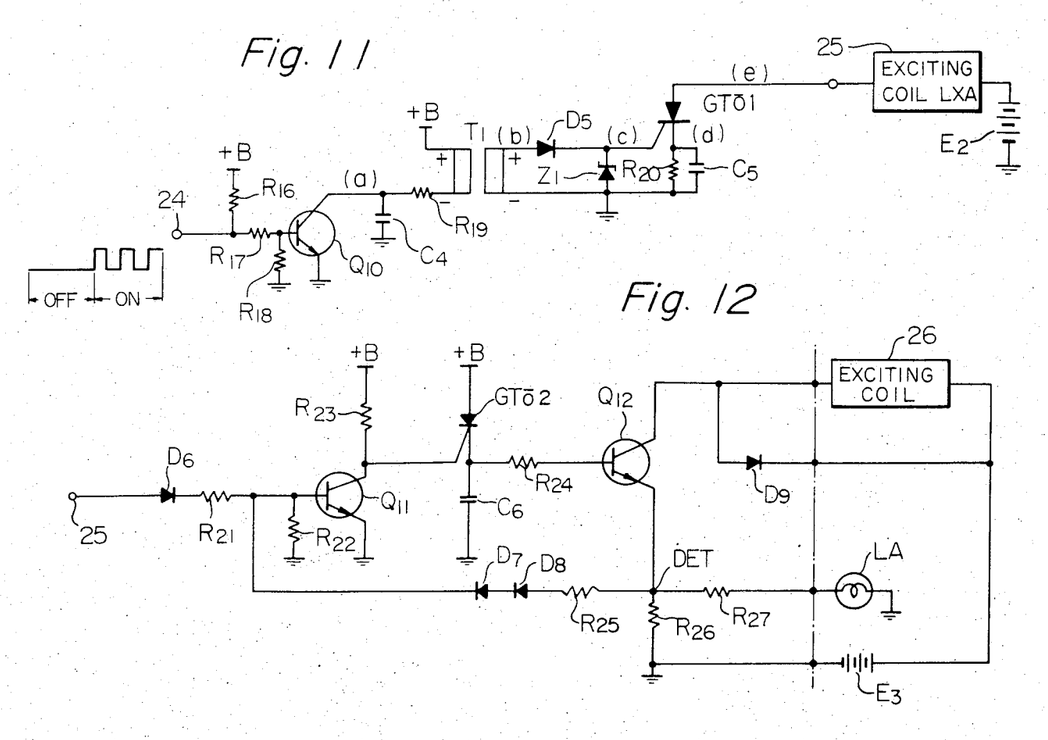
FIG. 11 is another example of a circuit diagram corresponding to FIG. 9.
FIG. 12 is still another example of a circuit diagram corresponding to FIG. 9.

FIG. 11 is another example of a circuit diagram wherein an exciting signal for an exciting coil is given by a series of repeating pulses instead of giving it simply an on or off DC signal. Referring to FIG. 11, an input terminal 24 is connected via a resistor $R_{17}$ to a base of a transistor $Q_{10}$ whose emitter is grounded and the input terminal 24 is also connected via a resistor $R_{16}$ to a positive potential source +B and the junction between the resistor $R_{17}$ and the base of the transistor $Q_{10}$ is connected via a resistor $R_{18}$ to ground. A collector of the transistor $Q_{10}$ is connected via a capacitor $C_4$ to ground and also connected via a resistor $R_{19}$ to a negative polarity terminal of a primary winding of a transformer $T_1$, a positive polarity terminal of the primary winding of the transformer $T_1$ is connected to the positive potential source +B. A negative polarity terminal of a secondary winding of the transformer $T_1$ is grounded. A positive polarity terminal of the secondary winding of the transformer is connected via diode $D_5$ to a cathode of a Zener Diode $Z_1$ whose anode is connected to a ground. The junction between a cathode of the diode $D_5$ and the cathode of the Zener Diode $Z_1$ is connected to a gate of a gate-turnoff-thyristor $\overline{GT01}$ whose anode is connected to one terminal of an exciting coil 25. A cathode of the gate-turnoff-thyristor $\overline{GT01}$ is connected via a parallel circuit of a resistor $R_{20}$ and a capacitor $C_5$ to a ground. Another terminal of the exciting coil is connected to a positive voltage source $E_2$.

Namely, in the case of an excitation, an intermittent pulse as shown by ON in FIG. 11 is applied to an input terminal 24 and excites alternately a primary winding of a pulse transformer $T_1$ via a transistor $Q_{10}$ and an induced secondary current in a secondary winding is rectified through a diode $D_5$ and then the rectified current renders a gate-turnoff-thyristor $\overline{GT01}$ conductive. Thus, the exciting current begins to flow through an exciting coil 25 from a DC supply source $E_2$. In proportion to the increasing of the exciting current, a potential on a point (d) rises above that on a point (c) and renders gate-turnoff-thyristor $\overline{GT01}$ non-conductive. As a result of this, the charge stored in a capacitor $C_5$ is discharged through a resistor $R_{20}$ and the $\overline{GT01}$ again assumes a conductive state. In the circuit shown in FIG. 11, by changing the repetition frequency of the intermittent pulses at the ON state, the exciting current becomes a smaller value than that of the exciting current obtained by the current detecting circuit.

FIG. 12 is still another example of a circuit diagram according to the present invention. Referring to FIG. 12, an input terminal 25 is connected via a diode $D_6$ and a resistor $R_{21}$ to a base of a transistor $Q_{11}$ whose emitter is grounded. A junction between the resistor $R_{21}$ and the base of the transistor $Q_{11}$ is connected via a resistor $R_{22}$ to a ground. A collector of the transistor $Q_{11}$ is connected via a resistor $R_{23}$ to a positive potential source +B, and is also connected to a gate of a gate-turnoff-thyristor $\overline{GT02}$ whose anode is connected to a positive source potential +B and whose cathode is connected via a capacitor $C_6$ to a ground. A junction between the capacitor $C_6$ and the cathode of the $\overline{GT02}$ is connected via a resistor $R_{24}$ to a base of a transistor $Q_{12}$ whose collector is connected to a junction between an exciting coil 26 and an anode of a diode $D_9$. An emitter of the transistor $Q_{12}$ is connected via a resistor $R_{26}$ to a ground and also via a resistor $R_{27}$ and a lamp LA to a ground. A junction between the emitter of the transistor $Q_{12}$ and the resistor $R_{26}$ is connected via a resistor $R_{25}$ and diodes $D_7$, $D_8$ to the junction between the base of the transistor $Q_{11}$ and the resistor 21. A positive voltage $E_3$ is applied to the junction between the exciting coil 26 and a cathode of the diode $D_9$.

In FIG. 12, when an exciting command signal (negative charge) is supplied to an input terminal 25, a transistor $Q_{11}$ assumes a cutoff state and then a gate-turnoff-thyristor $\overline{GT02}$ and a transistor $Q_{12}$ assumes an on state and thus, an exciting current begins to flow in an exciting coil 26. When the exciting current, i.e., a potential on a point DET, reaches a predetermined value, the transistor $Q_{11}$ becomes an on state through series diodes $D_7$ and $D_8$ and consequently, the gate-turnoff-thyristor $\overline{GT02}$ assumes a cutoff state. Accordingly, the exciting current is blocked and then the transistor $Q_{11}$ again assumes a cutoff state and the gate-turnoff-thyristor $\overline{GT02}$ again assumes an on state. Thus, the same operation can be followed successively. A lamp LA is provided as an excitation indicating lamp.

As stated previously, according to the present invention, the value of the series resistor in the exciting coil circuit can be reduced considerably or even to a minimum in practice and therefore, the power loss in the exciting coil circuit can be considerably lowered.

What is claimed is:

1. A system of driving a multiphase motor comprising an exciting coil for each phase of said motor, means connecting one terminal of each said exciting coil to a DC voltage source, a constant current switching circuit for each phase connected to the other terminal of said exciting coil of the respective phase and an exciting control signal generator having a plurality of output terminals, one of which is connected respectively to said constant current switching circuit of each phase, each said constant current switching circuit comprising a pulse generator receiving a control signal from said exciting control signal generator, switching means controlled by said pulse generator and controlling current to said exciting coil, detecting means for detecting exciting current of said coil and controlling said pulse generator to block said exciting current when it reaches a predetermined value.

2. A system according to claim 1, in which said pulse generator includes a transistor and said exciting current detecting circuit comprises a resistor connected in series with said exciting coil, a capacitor connected across said resistor and means connecting said capacitor with said transistor to change the conduction state of said transistor upon said capacitor being charged to a predetermined voltage.

3. A system according to claim 1, in which said exciting signal generator produces alternative on-off signals each composed of repeated pulse signals and in which said constant current switching circuits each comprise amplifying means, a transformer having a primary winding connected to said amplifying means and rectifying means in the secondary circuit of said transformer and switching means controlled by the rectified output of the secondary winding of said transformer.

4. A system according to claim 3, in which said switching means comprises a thyristor having a gate connected to said rectifying means.

5. A system according to claim 4, in which said exciting current detecting means is connected to said thyristor to turn off said thyristor when said current reaches a predetermined value.

6. A system according to claim 1, in which said constant current switching circuit comprises first transistor controlling said exciting current, a thyristor controlling the conductivity state of said transistor and a second transistor controlling said thyristor, said current detecting means being connected to and controlling said second transistor to block said exciting current when a predetermined value is reached.

* * * * *